A. W. CASH.
VALVE.
APPLICATION FILED JUNE 14, 1910.
1,043,065.
Patented Nov. 5, 1912.
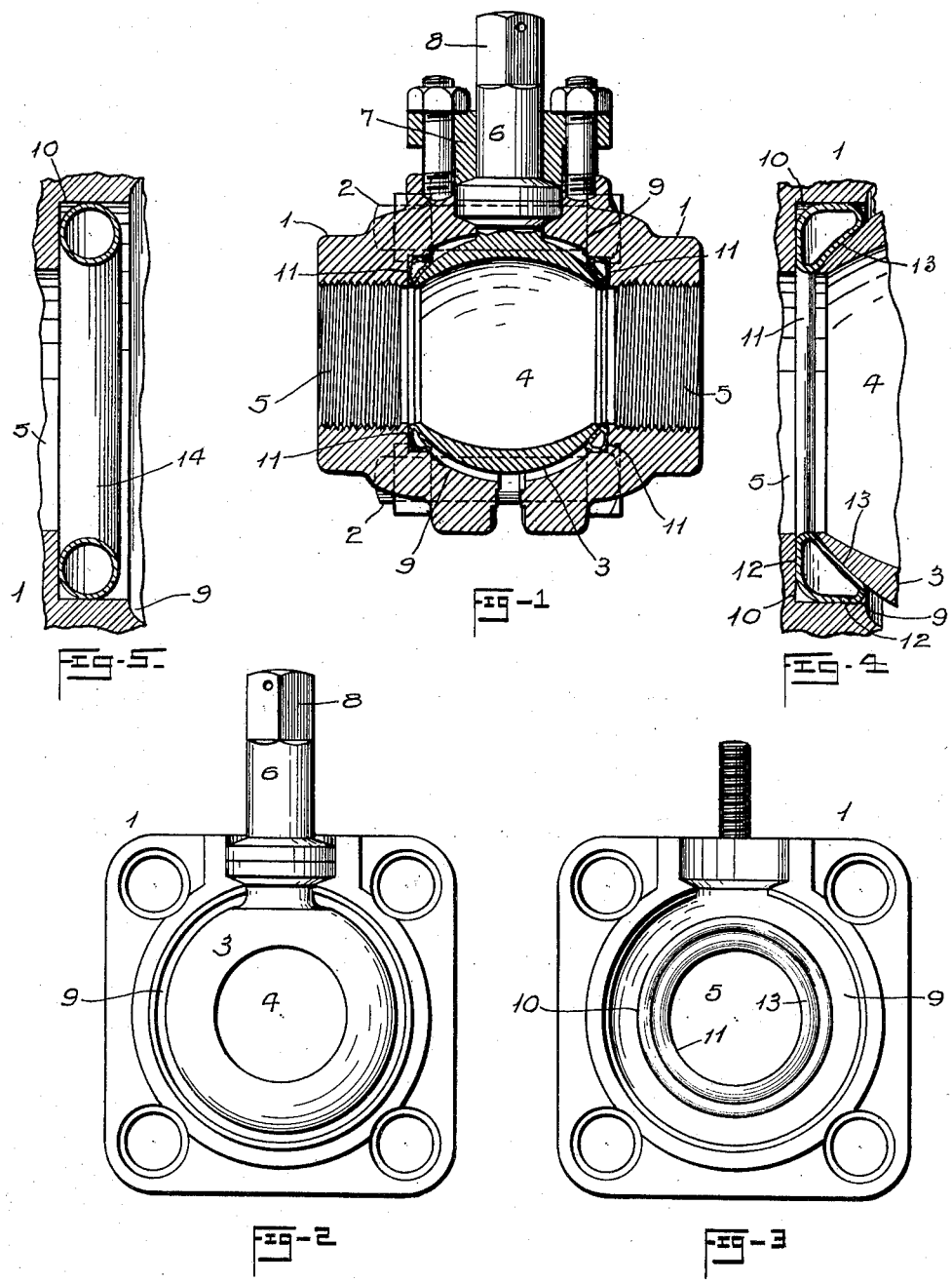
WITNESSES
INVENTOR
Arthur W. Cash,
BY
Russell M. Everett,
ATTORNEY.

UNITED STATES PATENT OFFICE.

ARTHUR W. CASH, OF NEWARK, NEW JERSEY.

VALVE.

1,043,065.

Specification of Letters Patent.

Patented Nov. 5, 1912.

Application filed June 14, 1910. Serial No. 566,759.

*To all whom it may concern:*

Be it known that I, ARTHUR W. CASH, a citizen of the United States, residing at Newark, in the county of Essex and State of New Jersey, have invented certain Improvements in Valves, of which the following is a specification.

This invention relates to that class of valves in which is employed a seat ring having upon one side of itself a fixed or stationary body and upon the other side of itself a movable or sliding member such as the valve proper.

The objects of the invention are to provide a seat ring which will present to the movable or sliding valve proper a seat which is not only resilient as a whole, but which also presents a malleable surface into which slight inequalities of the valve proper may impress permanent paths; to thus secure a valve seat which is tight fitting and impervious and will remain so during continued use of the valve; to secure cheapness and economy of labor in the production of such a valve seat, and to obtain other advantages and results as may be brought out in the following description.

Referring to the accompanying drawings, in which like numerals of reference indicate corresponding parts in each of the several figures, Figure 1 is a central longitudinal section of a valve embodying my present improvements; Figs. 2 and 3 show the two sections or halves of the valve casing separated and their meeting ends exposed, the valve proper remaining in the section shown in Fig. 2 and the seat ring in the one shown in Fig. 3; Fig. 4 is an enlarged detail of Fig. 1, showing the seat ring between the valve proper and valve body, and Fig. 5 shows a hollow ring in the recess of a valve casing section before the same has been crushed into a seat ring, as shown in Figs. 1 and 4.

The valve which I have shown in said drawings to illustrate my present invention is of the type shown in my prior Patent No. 909,545, issued January 12, 1909, but the invention is applicable to other types of valves. I do not confine myself to any particular application of the invention, so long as there is a fixed or stationary portion at one side of the seat ring, and a valve proper at the other side which is slidable with respect to said seat ring.

In said drawings, 1, 1 indicate the two sections or halves of the valve casing, adapted to be clamped together by bolts 2 and hold between themselves the valve proper 3. Said valve proper is spherical, as shown, and has a diametric channel 4 which can be brought into alinement with the bores 5, 5 of the sections 1, 1, or turned so that blank or closed portions of its outer walls close said bores. A spindle 6 is shown for turning the valve proper, provided with a stuffing box 7 and having an outer angular end 8. The bores of the two sections 1, 1 of the valve casing are suitably flared or enlarged at the adjacent ends of the sections to receive between themselves the valve proper, and impervious seats for said valve proper are provided in said flaring portions or enlargements 9, adjacent to the bores or flow passages 5. Each of the casing sections has for this purpose an annular recess 10 whose two walls at right angles to each other extend one to the bore 5 perpendicular thereto and the other to the flaring enlargement 9. In this recess is placed a seat ring 11, comprising a piece of tubing bent into ring-shape to fit the recess 10, and being of soft or malleable metal such as copper. The seat ring is in cross section crushed to fit against the valve proper 3 and walls of the groove 10 of the casing section, and this crushing can be done either by clamping the sections of the valve casing together against the valve proper, or by suitable dies before the valve portions are assembled.

The surface of the seat ring against the walls of the recess 10 assumes a somewhat angular shape, so as to have two broad contacts therewith 12, 12, as clearly shown in Figs. 1 and 5, and the opposite face of the seat ring crushes into a broad transverse curve 13 which provides a considerable area of contact for the valve proper. The resiliency of the seat ring due to its closed hollow shape and the air inclosed therein insures an impervious joint with the valve proper because of the pressure thereagainst, and this is of course indispensable in a valve where a seat ring is held between a fixed portion of the casing and a movable member or valve proper. On the other hand, the metal composing the seat ring is sufficiently soft so that any slight inequalities of the valve proper can indent themselves in said metal and thus form permanent paths in the seat ring for themselves as the valve proper is turned. The valve proper thus not only secures an impervious contact with the seat ring by reason of resilient pressure thereagainst, but all its little inequalities can form paths in the metal of the seat ring so that movement of the valve with respect to the seat ring to open the valve does not disturb the impervious relation.

In Fig. 5 is shown a ring 14 of circular cross-section, all ready to be crushed into the final shape of a seat ring as shown in Fig. 4.

While seat rings 11 and 11 are shown at opposite sides of the valve proper, 4, which I have shown, this is only because of the particular kind of valve, and in other kinds of valves there would be only one seat ring, as will be understood.

Having thus described the invention, what I claim is—

1. The combination of a casing providing a valve chamber having a seat in its inner wall, a malleable seat ring of hollow cross-section in said seat, a valve proper in said chamber of harder material than said seat ring and adapted to form a closure therewith, and means for shifting said valve proper with respect to said seat ring, whereby any inequalities of the valve proper form permanent paths in the seat ring because of its relative softness and at the same time the resiliency of the seat ring affords an impervious engagement between itself and the valve-proper as a whole.

2. The combination with a casing providing a valve chamber having a seat in its inner wall, a metal seat ring of hollow cross-section in said seat, a valve-proper in said chamber of metal hard enough to indent said metal seat ring and adapted to form a closure therewith, and means for shifting said valve proper with respect to said seat ring, whereby any inequalities of the valve proper form permanent paths in the seat ring because of its relative softness and at the same time the resiliency of the seat ring affords an impervious engagement between itself and the valve proper as a whole.

3. The combination of a malleable seat ring of hollow cross-section, means for holding said seat ring against edgewise movement, a valve proper of material hard enough to indent said seat ring, means for holding said valve proper against said seat ring, and means for sliding said valve proper edgewise of said ring, whereby any inequalities of the valve proper form permanent paths in the seat ring because of its relative softness and at the same time the resiliency of the seat ring affords an impervious engagement between itself and the valve proper as a whole.

4. The combination of a casing providing a chamber with an annular seat in its wall, a valve proper of circular cross-section in planes at right angles to the plane of said seat, a malleable ring in said seat softer than the valve proper and hollow in cross-section, said ring having a face projecting into the chamber and adapted to resiliently engage said valve proper, and means for turning said valve proper across said projecting face of the seat ring, whereby any inequalities of the valve proper form permanent paths in the seat ring because of its relative softness and at the same time the resiliency of the seat ring affords an impervious engagement between itself and the valve proper as a whole.

ARTHUR W. CASH.

In the presence of—
ERICH F. BREUER,
WM. R. GUSTIN.